United States Patent
Kammerer et al.

(10) Patent No.: US 9,878,791 B2
(45) Date of Patent: Jan. 30, 2018

(54) OVERHEAD LUGGAGE COMPARTMENT FOR AIRCRAFT

(71) Applicant: FACC AG, Ried/Innkreis (AT)

(72) Inventors: Bernhard Kammerer, Zell an der Pram (AT); Jakob Schoerkhuber, Geboltskirchen (AT)

(73) Assignee: FACC AG, Ried/Innkreis (AT)

( * ) Notice: Subject to any disclaimer, the term of this patent is extended or adjusted under 35 U.S.C. 154(b) by 4 days.

(21) Appl. No.: 14/765,369

(22) PCT Filed: Jan. 28, 2014

(86) PCT No.: PCT/AT2014/050031
§ 371 (c)(1),
(2) Date: Aug. 3, 2015

(87) PCT Pub. No.: WO2014/117198
PCT Pub. Date: Aug. 7, 2014

(65) Prior Publication Data
US 2015/0360780 A1    Dec. 17, 2015

(30) Foreign Application Priority Data

Feb. 1, 2013    (AT) .................. 50078/2013

(51) Int. Cl.
B64D 11/00    (2006.01)
(52) U.S. Cl.
CPC ............ B64D 11/003 (2013.01); *Y02T 50/46* (2013.01)

(58) Field of Classification Search
CPC ... B64D 11/0015; B64D 11/003; B64D 11/00; B64D 2011/0046; B64C 11/008
See application file for complete search history.

(56) References Cited

U.S. PATENT DOCUMENTS

| | | | |
|---|---|---|---|
| 5,549,158 A | | 8/1996 | Hart |
| 5,549,258 A | * | 8/1996 | Hart ..................... B64D 11/003 244/118.1 |
| 5,567,028 A | | 10/1996 | Lutovsky et al. |

(Continued)

FOREIGN PATENT DOCUMENTS

| | | |
|---|---|---|
| DE | 102007030331 A1 | 1/2009 |
| DE | 102009014573 A1 | 9/2010 |

(Continued)

*Primary Examiner* — Assres H Woldemaryam
(74) *Attorney, Agent, or Firm* — Laurence A. Greenberg; Werner H. Stemer; Ralph E. Locher (57) ABSTRACT

An overhead luggage compartment for aircraft can be constructed as a fixed luggage compartment with a stationary housing and a pivotable flap, or as a lowerable luggage compartment with a lowerable tray, a stationary part having side walls and a movable part which is pivotable between a closed and an open position and has a closure element for retaining the movable part in the closed position. Those parts define a luggage-receiving space. Two fastening devices for fastening to a supporting structure of the aircraft on the side walls of the stationary part are disposed on the stationary part. At least one further fastening device is disposed in the region of the lower side of the rear side of the stationary part. The fastening devices are the same for the fixed luggage compartment and for the lowerable luggage compartment.

29 Claims, 5 Drawing Sheets (56) References Cited

U.S. PATENT DOCUMENTS

| | | | | |
|---|---|---|---|---|
| 5,687,929 | A * | 11/1997 | Hart | B64D 11/003 244/118.1 |
| 5,716,027 | A * | 2/1998 | Hart | B64D 11/003 244/118.1 |
| 5,839,694 | A * | 11/1998 | Bargull | B64D 11/003 244/118.1 |
| 6,073,883 | A * | 6/2000 | Ohlmann | B64D 11/00 105/316 |
| 6,290,175 | B1 * | 9/2001 | Hart | B64D 11/003 244/118.1 |
| 6,398,163 | B1 * | 6/2002 | Welch | B64D 11/003 244/118.1 |
| 7,258,406 | B2 | 8/2007 | Stephan et al. | |
| 7,588,211 | B2 | 9/2009 | Granzeier et al. | |
| 8,360,365 | B2 | 1/2013 | Rahlff | |
| 8,430,358 | B2 | 4/2013 | Schneider et al. | |
| 8,534,603 | B2 | 9/2013 | Grosse-Plankermann et al. | |
| 8,636,251 | B2 | 1/2014 | Mayer et al. | |
| 2002/0066826 | A1 * | 6/2002 | Johnson | B64D 11/003 244/129.1 |
| 2003/0080247 | A1 * | 5/2003 | Frazier | B64D 11/003 244/118.1 |
| 2004/0245897 | A1 * | 12/2004 | Stephan | B60R 5/003 312/246 |
| 2005/0040287 | A1 * | 2/2005 | Stephan | B61D 37/003 244/118.5 |
| 2005/0230541 | A1 * | 10/2005 | Graf | B64D 11/003 244/118.5 |
| 2006/0214055 | A1 * | 9/2006 | Novak | B64D 11/003 244/118.5 |
| 2010/0288879 | A1 * | 11/2010 | Bock | B64D 11/003 244/118.5 |
| 2011/0139929 | A1 * | 6/2011 | Young | B64D 11/003 244/118.5 |
| 2011/0253837 | A1 * | 10/2011 | Lee | B64D 11/003 244/118.5 |
| 2011/0279741 | A1 * | 11/2011 | Smallhorn | B64D 11/0015 348/837 |
| 2012/0012702 | A1 * | 1/2012 | Moritz | F16F 1/18 244/118.5 |
| 2012/0038254 | A1 | 2/2012 | Rafler | |
| 2012/0074258 | A1 * | 3/2012 | Papke | B64C 1/066 244/118.5 |
| 2014/0246968 | A1 * | 9/2014 | Geng | B64D 11/003 312/319.2 |

FOREIGN PATENT DOCUMENTS

| | | | |
|---|---|---|---|
| DE | 102009051362 A1 | 5/2011 | |
| EP | 0718189 A1 | 6/1996 | |
| EP | 0731021 B1 | 10/1998 | |
| EP | 1436194 B1 | 8/2005 | |
| WO | 2010145915 A1 | 12/2010 | |
| WO | WO 2014127161 A1 * | 8/2014 | B64D 11/003 |

* cited by examiner

OVERHEAD LUGGAGE COMPARTMENT FOR AIRCRAFT

BACKGROUND OF THE INVENTION

Field of the Invention

The invention relates to an overhead luggage compartment for airplanes, which can be designed as a fixed bin with a stationary housing and a pivotable flap, or as a movable bin with a lowerable tray, with a stationary part having side walls and with a movable part which is pivotable between a closed and an open position around a rotation axis, and with a closure element for retaining the movable part in the closed position, said parts defining a luggage-receiving space, wherein fastening devices for fastening to a supporting structure of the airplane are arranged on the stationary part, and at least one suspension device for a passenger service unit is arranged.

Furthermore, the invention relates to an airplane having an aisle and overhead bins of the above type arranged on both sides of the aisle.

The present invention relates mainly to luggage bins for passenger planes. However, use for rail vehicles or other means of transport designed for passenger transport such as ships is also contemplated.

The invention relates to both fixed bins with a stationary housing and a pivotable flap and movable bins with a lowerable chute, most of which are lightweight constructions made of composite materials consisting of fibre-reinforced plastic and a honeycomb core.

Especially in passenger planes having only one aisle and seat rows arranged on both sides of the aisle with overhead bins arranged above them, finding a balance between as large a luggage-receiving space in the bins as possible and as much headroom for the passengers as possible is difficult. Apart from the necessary spatial requirements, increasing attention has to be paid to aesthetics in the passenger compartment of the plane and appearance.

Moreover, changing over from fixed bins and movable bins or pivot bins should be as simple as possible in order to be able to adapt the passenger planes to the desired configuration swiftly and easily. For example, in first class or business class movable bins are often desired, making it easier for passengers to load and unload the bins, but being characterised by a more complex design. In economy class, on the other hand, fixed bins are often provided, being characterised by a particularly durable design and a lower degree of complexity.

U.S. Pat. No. 5,716,027 discloses a fixed bin having an upwardly pivotable flap which may be retrofitted in airplanes. The bin has various fastening means on the side walls and/or the rear side, adapted for holding the fixed bin. In addition to this, a different implementation of luggage compartments having lowerable bins is described, in which the bins are fastened to a central bracket of the airplane having a number of aisles. The fastening locations and, consequently, the force transmission on the central bracket, however, are fundamentally different from the generic bins, which are fastened to the fuselage of the airplane.

Further bins for airplanes are known from DE 10 2007 030 331 A1, DE 10 2009 051 362 A1, US 2006/0214055 A1 and US 2012/0074258 A1, but a capability for retrofitting between the different types of bins as fixed and/or movable bins is not provided. The fastening and/or holding means used would not be designed for this in any case.

Moreover, DE 10 2009 014 573 A1 describes a bin for airplanes which may easily be changed between a fixed and a movable design. A disadvantage here, however, is that especially in the movable bins the luggage-receiving space is decreased considerably with respect to the fixed bins.

Other movable bins, such as those described in EP 1 436 194 B1 or EP 731 021 B1, have relatively complex force support mechanisms for supporting the opening and closing procedure, increasing the price for the bins, which is absolutely undesirable considering the price pressure that airlines are subject to nowadays.

For creating a protection against injuries by exposed areas of the lock of a bin, U.S. Pat. No. 7,588,211 B2 suggests placing a special cover element covering the locking mechanism on the flap of the bin. A disadvantage here, however, is that these additional elements increase the weight of the bin.

BRIEF SUMMARY OF THE INVENTION

The object of the present invention is to create an overhead bin for airplanes which includes as large a luggage-receiving space as possible both when designed as a fixed bin and when designed as a movable bin, but has as low a self-weight as possible at the same time. The bin should be producible as easily and economically as possible. Disadvantages of known overhead bins are to be avoided or at least reduced.

A further object of the present invention is to create an airplane, in particular an airplane having one aisle, which can be provided and rearranged with different overhead bins, i. e. fixed bins and/or movable bins, as swiftly and easily as possible. The bins should restrict the moving space of the passengers as little as possible and should be easy to load and unload.

The first object according to the invention is achieved by means of an overhead bin as mentioned above, wherein two fastening devices are arranged on the side walls of the stationary part and at least one further fastening device is arranged in the region of the lower side of the rear side of the stationary part, said fastening devices and said further fastening device for the fixed bin and the movable bin being the same, and the suspension device for the passenger service unit being arranged in the region of the rear side of the stationary part, so the passenger service unit may be arranged between the bin and the hull of the airplane, wherein the luggage-receiving space, in the closed position of the movable part, has an end-to-end depth of at least 61 cm and an end-to-end height of at least 36 cm and a volume of at least 250 dm$^3$, so pieces of luggage can be placed in an endwise horizontal position.

Such an overhead bin, which may be designed as both a fixed bin and a movable bin, permits receiving most pieces of cabin luggage in an endwise horizontal or vertical position, which has not been possible with previous bins. By arranging pieces of luggage the dimensions of which are within the range of the conventional values for pieces of cabin luggage (maximum size according to the IATA, International Air Transport Association: 25×45×56 cm) in an endwise horizontal or vertical position, a higher volume of cabin luggage may be loaded into the bins. Moreover, the fastening devices on the stationary part of the overhead bin are designed such that a particularly easy and swift retrofitting between fixed and movable bins as desired by the airplane's operator may be obtained. It is also possible to rearrange an airplane at short notice for certain periods of use, for example by changing the numbers of movable bins for first class and business class for some time. Since in contrast to many prior art bins the passenger service unit is no longer arranged on the lower side of the bins but between the bins and the hull of the airplane, the retrofitting can be obtained particularly swiftly and easily without making changes to the electrical system or the ventilation system. What is important for the overhead bins according to the invention is that the same suspension and/or fastening locations are provided for both types of bins (fixed bins and movable or pivoted bins), so no changes need to be made to the fastening devices on the supporting structure of the airplane. For this purpose, fastening devices are provided on the side walls of the bin, preferably absorbing force mainly in the y direction (i. e. in the longitudinal direction of the wings) and in the z direction (i. e. in the vertical direction), on the one hand. On the other hand, at least one further fastening device is arranged on the lower side of the rear side, preferably absorbing force mainly in the y direction and in the x direction (direction of flight).

The fastening devices may be formed by parts, in particular metal parts, having at least one fastening tab, which parts, in particular metal parts, are connected to the side wall and/or rear side of the stationary part, in particular screwed, riveted or glued. The overhead bins are suspended from the supporting structure of the airplane via the side walls and the rear side of the stationary part for absorbing forces in the y and z directions, i. e. in the sideways and vertical directions seen in the direction of flight of the airplane.

Moreover and preferably, a further fastening device for absorbing forces in the x direction, i. e. in the direction of advancement of the airplane, as well as preferably two fastening devices for absorbing forces in the y direction, i. e. in the direction of the airplane's wings, are provided, formed by appropriate elements that are fastened in the region of the lower side of the rear side of the stationary part of the bin. For obtaining the desired force absorption it is favourable for at least one further fastening device to extend in the horizontal plane (xy plane) in an angle, in particular in an acute angle, towards the x direction (direction of flight). Furthermore, it is favourable for at least one further fastening device to extend in the horizontal plane (xy plane) in the y direction, i. e. in the longitudinal direction of the wings.

Preferably, elements for combined force support and damping of the movement of the movable part are arranged between the stationary part and the movable part of the bins. On the fixed bins these elements are appropriate dampers, which prevent the pivotable flap from swinging open too fast during opening. On movable bins such force support elements and damping elements facilitate the opening of unloaded trays and damp the course of movement during opening, on the one hand, and support the closing procedure of loaded trays, on the other hand, so closing the bins without problems is possible even for less strong passengers.

Advantageously, the stationary part and the movable part of the overhead bin are made of a plastic composite material. Mainly, fibre-reinforced plastics (GFRP, glass-fibre-reinforced plastics, and CFRP, carbon-fibre-reinforced plastics) and lightweight honeycombs are used for this. By doing so, the self-weight of the bins may be particularly low without compromising their strength and stability.

According to another feature of the invention a handrail, which is ideally formed by a recess extending in the horizontal direction, is arranged on the side of the movable part that is visible in the closed position of the movable part. Passengers may support themselves on these recesses using their fingers while walking along the aisle of the airplane.

When designing the bin as a fixed bin, the stationary part is substantially designed in the shape of a cuboid having an open front side and the movable part is designed as a flap, which flap is pivotable around a rotation axis arranged on the top edge of the open front side. In order to allow loading of the bin by cabin luggage in endwise horizontal or vertical position, the interior is at least 61 cm deep and at least 36 cm high end-to-end and has a volume of at least 250 $dm^3$, as has already been mentioned above.

On the top side of the stationary part a light source may be arranged. This facilitates installing the illumination means, on the one hand, and allows illuminating the interior of the airplane in both the closed and the open position of the flap of the overhead bin, on the other hand. When the flap of the bin is closed, the light illuminates the visible side of the ceiling panel for covering the interior of the airplane and thus provides pleasant indirect lighting. When the flap of the overhead bin is open, the light reaches the lower side of the flap through a gap and is reflected into the interior of the bin and into the interior of the airplane. The position of the light source is chosen such that the passengers are not directly illuminated and/or blinded from anywhere.

Preferably, the lower side of the stationary part is designed reinforced in order to prevent a breaking of the bin due to overloading or overstraining in case of an emergency or at least to make this more unlikely to occur. The reinforced design of the lower side of the stationary part of the bin may be obtained by arranging additional layers of fibre-reinforced plastic or possible honeycombs arranged between them, or by a reinforcement using other materials.

The width of the luggage-receiving space is at least 100 cm, preferably 104.5 cm. Such a width of the bin permits an easy installation between two frames of the airplane's fuselage, which are usually arranged at such a distance. Provided that the overhead bin is designed sufficiently stable, even larger dimensions, e. g. up to 2 m or even above, may be obtained as well, and the bins may be fastened over the distances of four frames of the airplane's fuselage, for example.

In the version of the movable or pivoted bin the stationary part having the side walls is designed substantially as a cuboid-shaped enclosure having an open lower side and the movable part is designed as a tray or chute which is pivotable around the rotation axis, wherein at least one force transmission element is arranged on the rear side of the tray, establishing a connection to the stationary part in the closed position of the tray, so forces may be discharged from the tray via the stationary part into the supporting structures of the airplane. By discharging the forces via the at least one force transmission element in the closed position of the bin, the tray may be designed relatively lightweight, so the total weight of the overhead bin may be reduced also in this type of construction while having a high volume of the luggage-receiving space at the same time. In this way, movable bins that are built relatively simple and lightweight may also be produced.

According to one implementation, the at least one force transmission element is formed by a bolt arranged on the rear side of the tray and a reception for the bolt arranged on the inside of the stationary part. Alternatively, the bolt is arranged on the inside of the stationary part and the reception for the bolt is arranged on the rear side of the tray. The bolt and the reception for the bolt are preferably screwed, riveted or glued to the tray and the stationary part of the bin, respectively. The bolt and the reception element are preferably made of metal, but may also be made of plastic, for example by the RTM (resin transfer moulding) method.

The tray is substantially composed of a bottom element forming the lower side and the rear side, and side boards. The side walls of the movable element, i. e. the tray, may be designed relatively short as so-called side boards. The tray is a so-called half chute.

Preferably, the bottom element of the tray is designed reinforced. As with the lower side of the stationary part in the fixed bins, an element of multiple layers of fibre-reinforced plastic having honeycombs arranged between them may be used here as well.

The rotation axis, around which the movable part, i. e. the tray, is pivotable, is arranged in the rear part of the side walls. In this way, an ideal balance between opening unloaded trays as easily as possible and closing loaded trays as easily as possible is obtained. In any case, the region of the rotation axis is located behind the centre of gravity of the bin's tray.

The closure element may be connected to snapping elements arranged on the side walls of the tray via a shaft, which snapping elements may be snapped into corresponding closure counterparts screwed to the stationary part. Alternatively, the snapping elements may be connected to the stationary part while the closure counterparts are arranged on the side walls of the tray. Such a construction provides ideal support for the closed tray since at least two snapping elements snap laterally into the corresponding closure counterparts and possibly an additional locking device is arranged in the centre.

If at least two elements for combined force support and damping of the movement of the movable part are arranged and connected to each side wall of the stationary part in front of or behind the rotation axis, an ideal support of the opening procedure of an empty tray and a closing procedure of a loaded tray may be obtained. Due to the combination of force support and damping in one element, little space is required for this device, so the major portion of the available space may be used for receiving pieces of luggage. In particular, the combined damping and force support elements are pneumatic or hydraulic spring dampers.

The second object according to the invention is achieved by an airplane as mentioned above having one aisle and overhead bins arranged on both sides of the aisle, which are optionally designed according to both of the versions described above, i. e. the fixed bins and the movable bins.

The passenger service units are arranged between the overhead bins and the supporting structure of the airplane and are substantially flush with the lower plane of the overhead bins. By arranging the passenger service units (PSU) not below the bins but next to them between the outer wall or hull of the airplane and the lower edge of the bins, retrofitting is possible even easier. Furthermore, electrical supply and air supply for the oxygen masks and ventilation of the passenger compartment may be installed easier.

Advantageously, the rotation axis of the movable part of the overhead bins is arranged at a lateral distance of 81 to 91 cm and at a height of 177 to 187 cm from the centre of the floor of the aisle. In this way, an area of 10×10 cm is created, in which the arrangement of the rotation axis of the movable part of the movable overhead bin acts for an ideal course of movement of the tray.

In accordance with the contour of the airplane's fuselage, the overhead bins arranged in the rear of the airplane are designed smaller and the visible front sides of the overhead bins are arranged along a line. This creates an appealing design of the airplane's interior, but bins specifically produced for the rear of the airplane are required, providing a slightly smaller luggage-receiving space.

In the front of the airplane, preferably overhead bins having a lowerable tray as described above are arranged, and in the rear fixed overhead bins having an upwardly pivotable flap are arranged. In this way, first class or business class of the airplane, which are usually located in the front of the airplane, may be furnished with movable bins that are more convenient to load and unload, and economy class may be furnished with fixed bins.

On the top side of the stationary part of the overhead bins connecting elements may be arranged for tool-free application of cover panels. In this way, ceiling panels, which are arranged between the overhead bins on both sides of an aisle, may be installed swiftly and without the use of tools. By fixedly arranging the connecting elements on the overhead bins and the corresponding counterparts on the cover panels, loose elements such as screws or the like are avoided as well.

BRIEF DESCRIPTION OF THE SEVERAL VIEWS OF THE DRAWING

The invention will be discussed in more detail by means of figures showing exemplary embodiments of the overhead bins. In the drawings.

DESCRIPTION OF THE INVENTION

Figure 1:
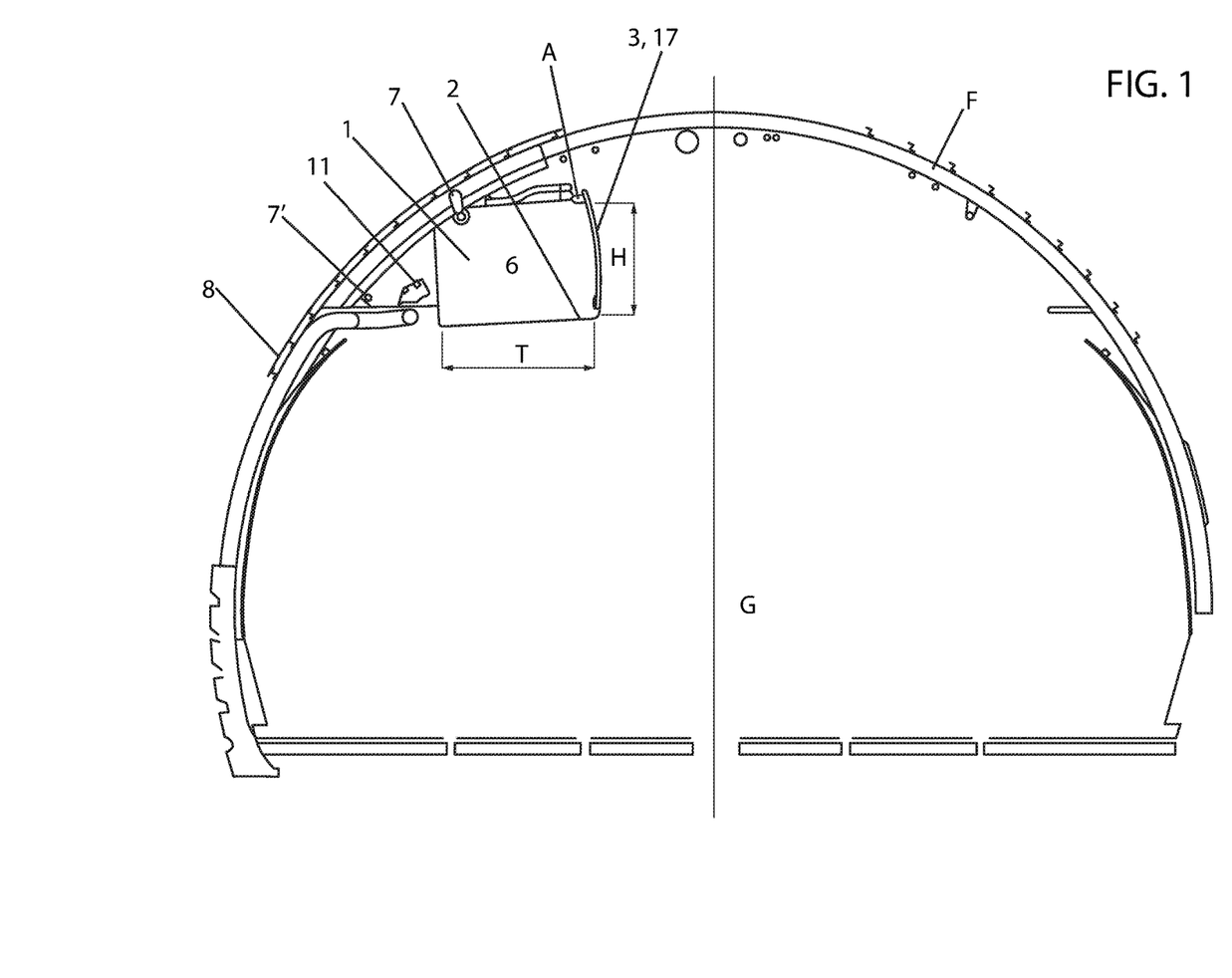
FIG. 1 shows a cross-section through a part of an airplane's fuselage having one aisle with overhead bins having fixed containers and pivotable flaps.

FIG. 1 illustrates schematically a part of a fuselage of an airplane F having one aisle G and overhead bins 1 arranged on the left-hand side of the aisle G. Typically, like overhead bins 1 are arranged on the right-hand side of the aisle G as well, but they are omitted here for the sake of simplicity. The overhead bins 1 comprise a stationary part 2 having side walls 4 (see FIG. 5) and a movable part 3 which is designed pivotable around a rotation axis A. In the illustrated example the overhead bins 1 are so-called fixed or stationary overhead bins 1, in which the stationary part 2 is substantially designed in the shape of a cuboid having an open front side and the movable part 3 is designed as a flap 17. The flap 17 is pivotable around a rotation axis A arranged on the top edge of the open front side of the cuboid-shaped stationary part 2. The overhead bin 1 is fastened to the supporting structure 8 of the airplane F by appropriate fastening devices 7, 7'. For absorbing forces in the y and z directions, i. e. sideways to the direction of advancement of the airplane F and in a vertical direction to the direction of advancement of the airplane F, fastening devices 7 are placed on the side walls 4 of the stationary part 2 and the rear side 11 of the stationary part 2 of the overhead bin. The fastening devices 7 are connected to the side wall 4 and the rear side 11 of the stationary part 2, respectively, in particular screwed, riveted or glued. By means of further fastening devices 7', which are arranged in the region of the rear side 11 of the stationary part 2 of the overhead bin 1, forces are discharged in the y direction, i. e. in the direction of the wings of the airplane F, and in the x direction, i. e. in the direction of advancement of the airplane F. The passenger service units 10, which include reading lamps, ventilation holes and oxygen masks for the passengers, are located between the stationary part 2 of the overhead bin 1 and are substantially flush with the lower side of the overhead bins 1. The passenger service units 10 are arranged by appropriate suspension devices 9 in the region of the rear side 11 of the stationary part 2 of the overhead bins 1. By arranging the passenger service units 10 laterally next to the overhead bins 1, a greater height H is available for pieces of luggage in the luggage-receiving space 6 of the overhead bin 1, so an overhead bin 1 having an end-to-end depth T of at least 61 cm and an end-to-end height H of at least 36 cm may be obtained. This makes it possible to arrange pieces of luggage in the overhead bin 1 in an endwise horizontal or vertical position. More details of the overhead bins 1 are discussed in FIGS. 3 and 5.

Figure 2:
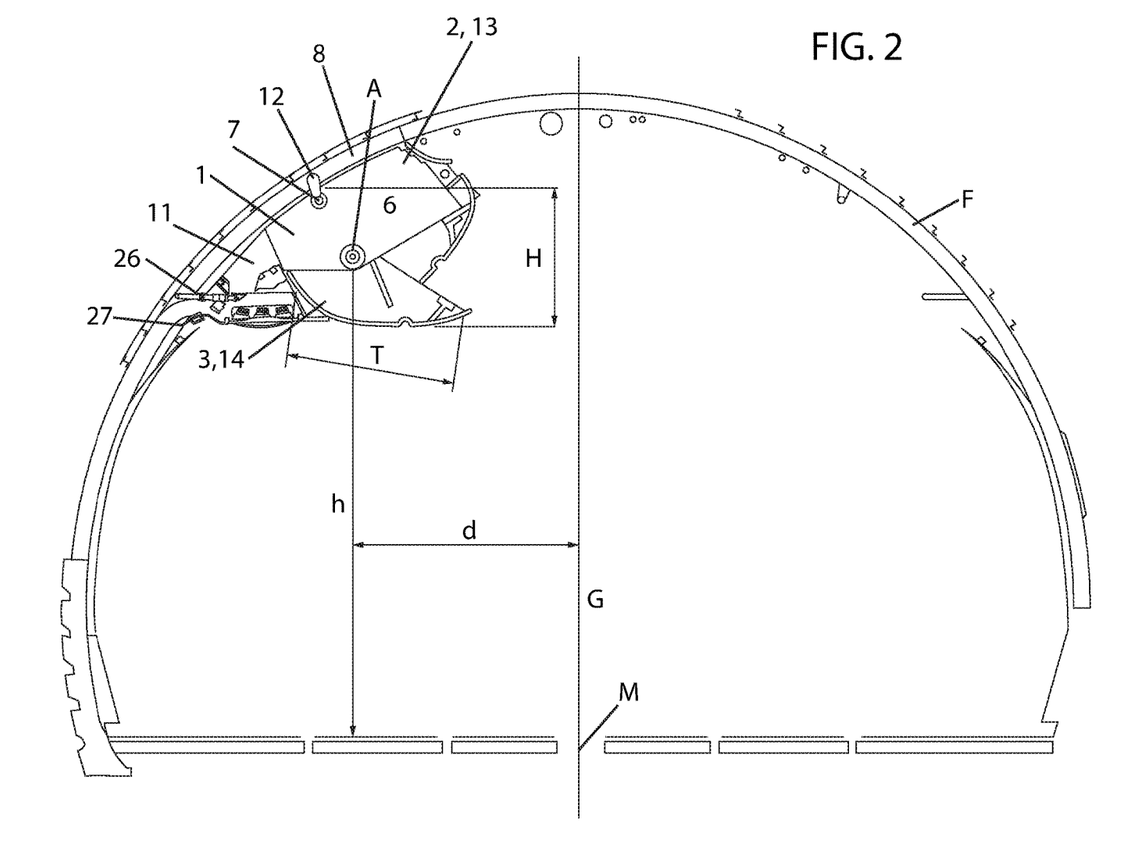
FIG. 2 shows a cross-section through a part of an airplane's fuselage having one aisle with overhead bins having lowerable trays.

FIG. 2 shows a section through a part of a fuselage of an airplane F having overhead bins 1 of another type of construction arranged therein, i. e. having an lowerable movable part 3 which is designed as a tray 14. Accordingly, the stationary part 2 of the overhead bin 1 is designed as a substantially cuboid-shaped enclosure 13 having an open lower side and the movable part 3 is designed as a pivotable tray 14. The tray 14 is designed as a so-called half chute and substantially consists of a bottom element 22 forming the lower side and the rear side, and side boards 23. The tray 14 is arranged pivotable between a closed and an open position around a rotation axis A. As with the overhead bins 1 according to FIG. 1, the stationary part 2 of the overhead bin 1 is suspended from the supporting structure 8 of the airplane F via suitable fastening devices 7, 7'. What is important here is that the corresponding fastening devices 7, 7' are the same with both the overhead bin 1 according to FIG. 1 and the overhead bin 1 according to FIG. 2, so retrofitting the airplane F is possible easily. Again, the passenger service unit 10 is arranged between the stationary part 2 of the overhead bin 1 and the skin of the airplane F. In the closed position of the tray 14, the overhead bin 1 having a lowerable tray 14 also has an end-to-end depth T of at least 61 cm and an end-to-end height H of at least 36, so pieces of luggage can be arranged in an endwise horizontal or vertical position. For an ideal course of movement of the movable part 3 and/or the tray 14 between the closed position and the open position, the rotation axis A is arranged behind the centre of gravity of the movable part 3, preferably at a height h between 177 and 187 cm from the centre M of the floor of the aisle G of the airplane F and at a lateral distance d of 81 to 91 cm from the vertical plane through the centre M of the floor of the aisle G. More details on the lowerable overhead bin 1 according to FIG. 2 are to be found, in particular, in FIGS. 4 and 6.

Figure 3:
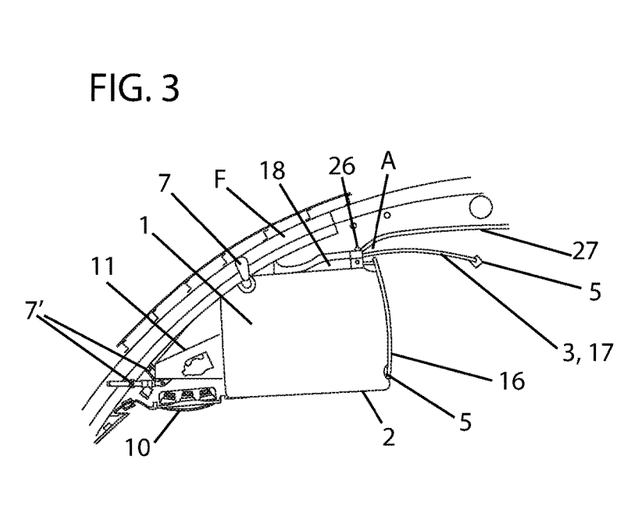
FIG. 3 shows a side view through a fixed overhead bin having a pivotable flap according to FIG. 1 in detail.

FIG. 3 shows a side view through an overhead bin 1 according to FIG. 1 in an enlarged representation. The stationary part 2 of the overhead bin 1 is substantially designed in the shape of a cuboid having an open front side and includes a movable part 3 designed as a flap 17. The flap 17 is arranged pivotable around a rotation axis A of the stationary part 2 arranged on the top edge of the open front side. On the top side of the stationary part 2, a light source 18 may be arranged, projecting the light to the lower side of a cover panel 27 in the closed position of the flap 17 and projecting the light through a gap to the lower side of the flap 17 in the open position of the flap 17, so both the interior of the overhead bin 1 and the aisle G of the airplane F are lighted sufficiently. A closure element 5 is arranged on the flap 17, retaining the flap 17 in the closed position and requiring appropriate actuation in order to open it. For force support, suitable elements 15 for combined force support and damping are arranged between the stationary part 2 and the movable part 3 of the overhead bin 1 (not illustrated). On the side of the movable part 3 and/or the flap 17 that is visible in the closed position of the flap 17, a handrail 16 in the shape of a horizontally extending recess for the fingers of the passengers may be arranged. Furthermore, connecting elements 26 for tool-free fastening of the cover panels 27 may be arranged on the top side of the stationary part 2.

Figure 4:
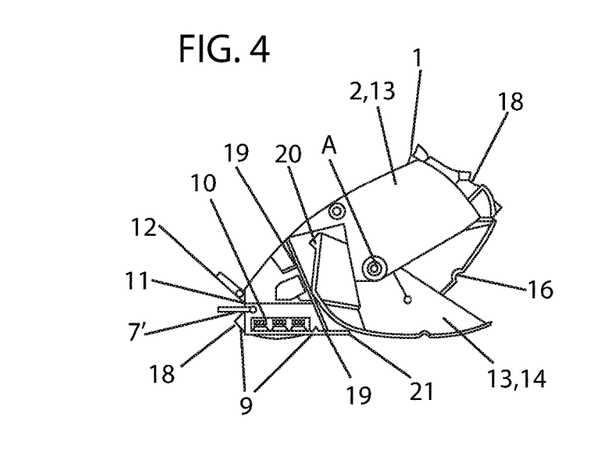
FIG. 4 shows a side view through a movable overhead bin according to FIG. 2 in detail.
Figure 10:
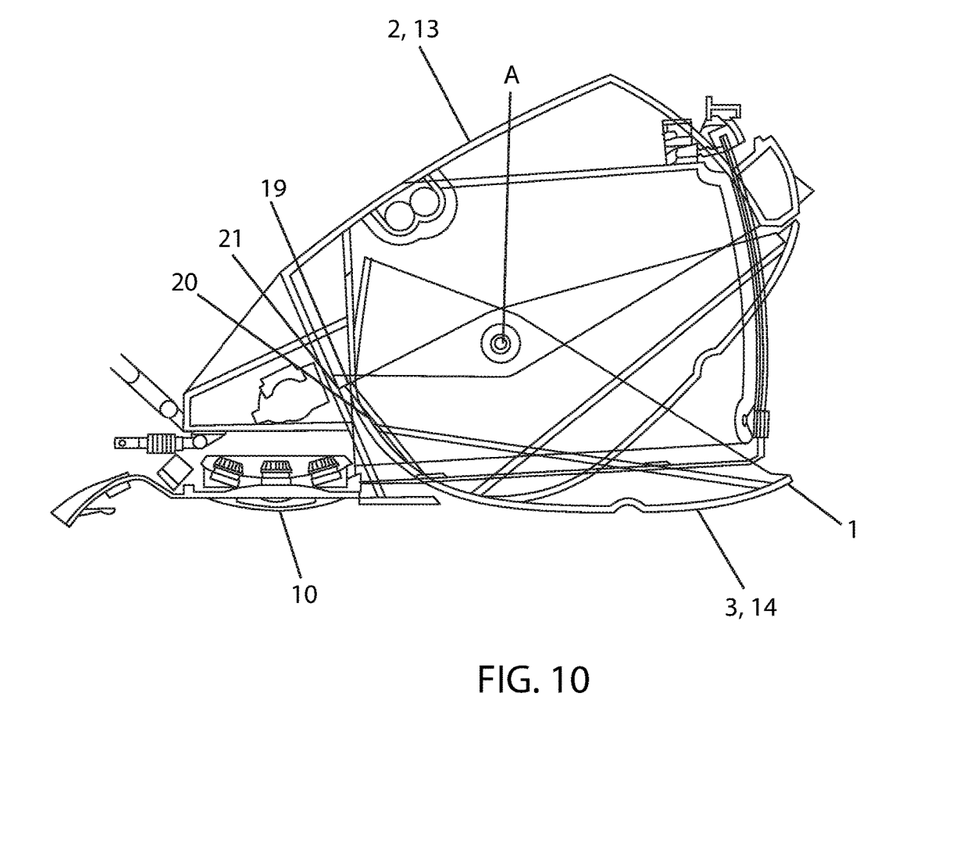
FIG. 10 shows a detail of an overhead bin having a lowerable tray according to FIGS. 2, 4 and 6 in the region of the force transmission element.

FIG. 4 shows a detail of an overhead bin 1 having a lowerable movable part 3 designed as a tray 14 according to FIG. 2. Here, the stationary part 2 having the side walls 4 (see FIG. 6) is designed as a substantially cuboid-shaped enclosure 13 having an open lower side and the movable part 3 is designed as the tray 14 that is pivotable around the rotation axis A. According to the invention, a force transmission element 19 is arranged on the rear side of the tray 14, establishing a connection to the stationary part 2 in the closed position of the tray 14, so forces may be discharged from the tray 14 via the stationary part 2 into the supporting structures 8 of the airplane F. FIG. 10 shows the force transmission element 19 in detail. The bottom element 22 of the tray 14 may be designed reinforced in order to withstand the relatively high forces of the pieces of luggage.

Figure 5:
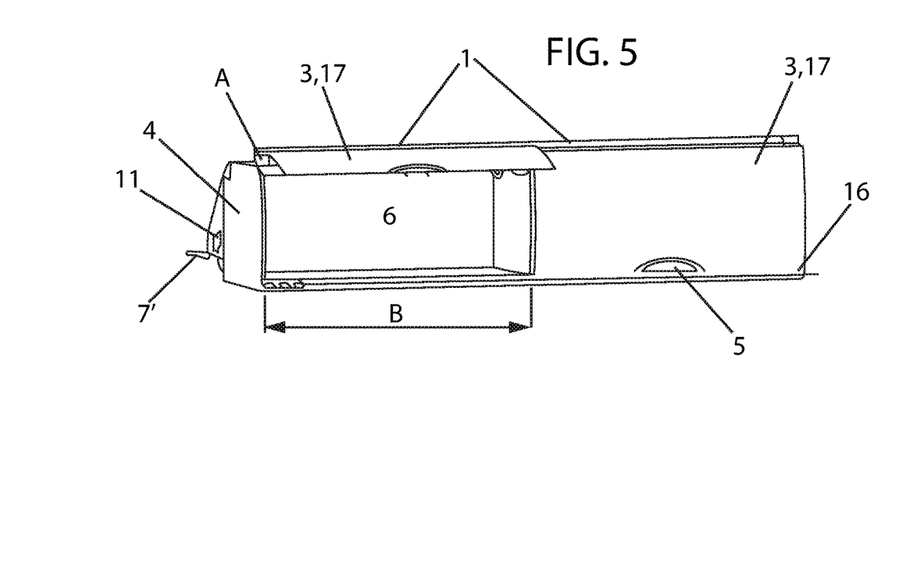
FIG. 5 shows a perspective view of two fixed overhead bins according to FIGS. 1 and 3 having an open and a closed flap.

FIG. 5 shows a perspective view of two overhead bins 1 according to FIGS. 1 and 3 with an open flap 17 on the left-hand overhead bin 1 and a closed flap 17 on the right-hand overhead bin 1.

Figures 6, 7, 8:
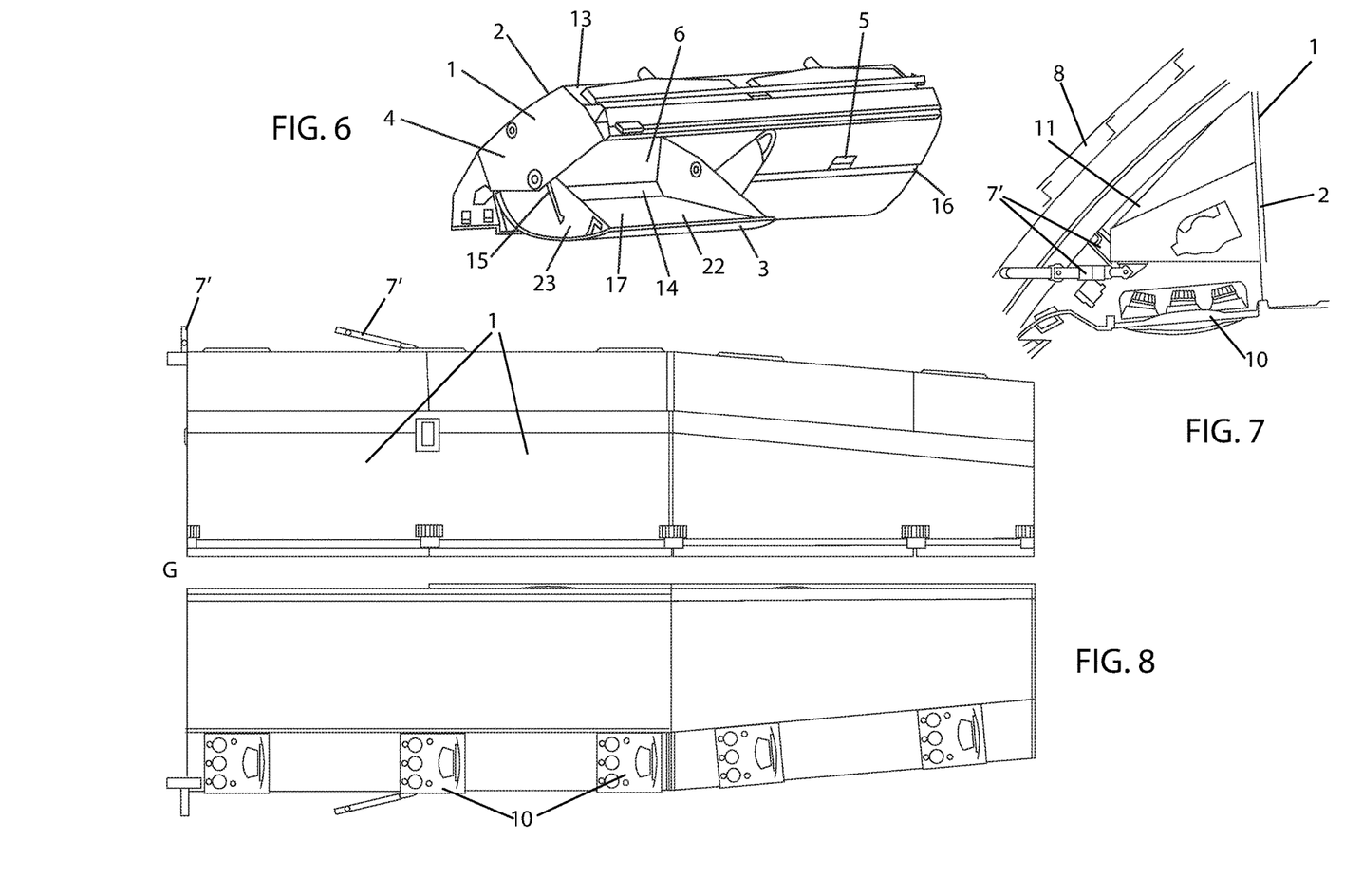
FIG. 6 shows a perspective view of two movable overhead bins according to FIGS. 2 and 4 in open and closed position.
FIG. 7 shows a detail of the suspension of an overhead bin in the region of the rear side of the stationary part in a side view.
FIG. 8 shows a section view through a part of an airplane's fuselage in the rear of the airplane in the direction of the overhead bins arranged above the aisle.

FIG. 6 shows two overhead bins 1 having lowerable trays 14 according to FIGS. 2 and 4, wherein the tray 14 is illustrated in the open position on the left-hand overhead bin whereas the tray 14 is illustrated in the closed position on the right-hand overhead bin.

FIG. 7 shows a detail of the suspension of the passenger service unit 10 in the region of the rear side 11 of the stationary part 2 of the overhead bin 1. In addition, suitable suspension devices 9 are installed, to which the passenger service unit 10 is appropriately attached.

FIG. 8 shows a view of the lower side of overhead bins 1 in the rear of the fuselage of an airplane F, wherein the rear side of the overhead bins 1 is adapted to the decreasing cross-section of the airplane's fuselage whereas the visible front sides of the overhead bins 1 are arranged along a line so that the aisle G has a consistent width. This creates a uniform line even though the overhead bins 1 in the rear, consequently, have a slightly smaller volume.

Figure 9:
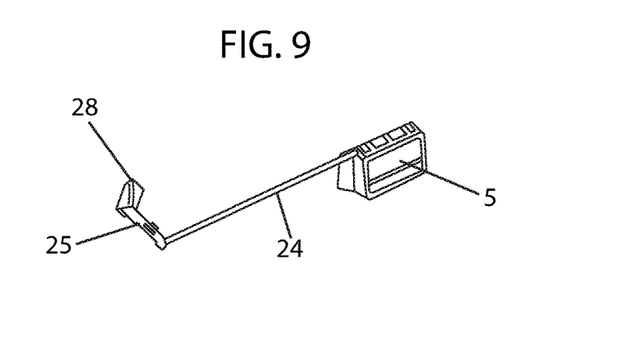
FIG. 9 shows a detail of the closure mechanism of a movable overhead bin.

FIG. 9 shows a detail of a closure mechanism of an overhead bin 1 having a lowerable tray 14 according to FIGS. 2, 4 and 6. The closure element 5 is connected to snapping elements 25 arranged on the side boards 23 of the tray 14 via a shaft 24, which snapping elements 25 may be snapped into corresponding closure counterparts 28 screwed to the side walls 4 of the stationary part 2. The closure mechanism is illustrated for only one side; typically a correspondingly mirror-symmetrically arranged mechanism is located on the other side of the closure element 5 as well. The shaft 24 may be made of carbon-fibre-reinforced plastic.

In the end, FIG. 10 shows a detail of an overhead bin 1 having a lowerable tray 14 according to FIGS. 2, 4 and 6 in the region of the force transmission element 19, which is formed by a bolt 20, for example, and connected to the rear side of the tray 14, preferably screwed, riveted or glued. As the counterpart, a reception 21 for the bolt 20 is arranged on the inside of the stationary part 2 and/or the enclosure 13. In the closed state of the tray 14, the bolt 20 is received by the reception 21, and as a consequence forces from the interior of the tray 14 may be transmitted into the reception 21 via the bolt 20 and then into the stationary part 2 and/or the enclosure 13 of the overhead bin 1, and discharged into the supporting structure 8 of the airplane F via the fastening elements 7, 7'. In this way, the tray 14 may be constructed relatively lightweight, since in the closed state of the tray 14 the forces are discharged via the force transmission element 19.

The invention claimed is:

1. An overhead luggage compartment for an airplane, the overhead luggage compartment comprising:
    a fixed bin with a stationary housing and a pivotable flap or a lowerable bin with a lowerable tray;
    a stationary part having a rear side with a lower side and side walls and a movable part being pivotable between a closed position and an open position around a rotation axis;
    a closure element for retaining said movable part in said closed position;
    at least one suspension device for a passenger service unit, said at least one suspension device being disposed in a vicinity of said rear side of said stationary part, permitting the passenger service unit to be disposed between said bins and a hull of the airplane;
    two fastening devices for absorbing forces in sideways and vertical directions to a direction of advancement of the airplane, said fastening devices being disposed on said side walls of said stationary part;
    at least one further fastening device for absorbing forces in the sideways direction to the direction of advancement of the airplane and in the direction of advancement of the airplane, said at least one further fastening device being disposed in a vicinity of said lower side of said rear side of said stationary part;
    said fastening devices and said at least one further fastening device for said fixed bin or said lowerable bin being constructed to be disposed at least at one of the same suspension or fastening locations on a supporting structure of the airplane; and
    said fixed or lowerable bin defining a luggage-receiving space having an end-to-end depth of at least 61 cm, an end-to-end height of at least 36 cm and a volume of at least 250 dm$^3$, permitting pieces of luggage to be positioned on-edge in said fixed or lowerable bin with said movable part in said closed position.

2. The overhead luggage compartment according to claim 1, wherein said fastening devices and said at least one further fastening device are formed by parts having at least one fastening tab, and said parts are connected to at least one of said side wall or said rear side of said stationary part.

3. The overhead luggage compartment according to claim 2, wherein said parts are metal parts, and said metal parts are screwed, riveted or glued to said at least one of said side wall or said rear side of said stationary part.

4. The overhead luggage compartment according to claim 1, which further comprises elements disposed between said stationary part and said movable part for combined force support and damping of a movement of said movable part.

5. The overhead luggage compartment according to claim 1, wherein said stationary part and said movable part are made of a plastic composite material.

6. The overhead luggage compartment according to claim 1, which further comprises a handrail disposed on a side of said movable part being visible in said closed position of said movable part.

7. The overhead luggage compartment according to claim 1, wherein said stationary part has a substantially cuboid shape with an open front side having a top edge, said movable part is constructed as a flap being pivotable around said rotation axis, and said rotation axis is disposed on said top edge of said open front side.

8. The overhead luggage compartment according to claim 7, which further comprises a light source disposed on a top side of said stationary part.

9. The overhead luggage compartment according to claim 7, wherein said stationary part has a reinforced lower side.

10. The overhead luggage compartment according to claim 7, wherein said luggage-receiving space has a width of at least 100 cm.

11. The overhead luggage compartment according to claim 7, wherein said luggage-receiving space has a width of 104.5 cm.

12. The overhead luggage compartment according to claim 1, wherein:
    said stationary part having said side walls is constructed as a substantially cuboid enclosure having an open lower side;
    said movable part is constructed as a tray being pivotable around said rotation axis and having a rear side; and
    at least one force transmission element is disposed on said rear side of said tray, establishing a connection to said stationary part in a closed position of said tray, permitting forces to be discharged from said tray through said stationary part into the supporting structure of the airplane.

13. The overhead luggage compartment according to claim 12, wherein said at least one force transmission element is formed by a bolt disposed on said rear side of said tray and a receptacle for said bolt disposed inside said stationary part.

14. The overhead luggage compartment according to claim 12, wherein said tray is substantially composed of side boards and a bottom element forming said lower side and said rear side.

15. The overhead luggage compartment according to claim 14, wherein said bottom element of said tray is reinforced.

16. The overhead luggage compartment according to claim 12, wherein said rotation axis is disposed in a rear part of said side walls.

17. The overhead luggage compartment according to claim 12, wherein:
    said tray has side boards;
    snapping elements are disposed on said side boards;
    a shaft connects said closure element to said snapping elements; and
    counterparts into which said snapping elements are snapped are screwed to said stationary part.

18. The overhead luggage compartment according to claim 12, which further comprises at least two elements disposed and connected to each side wall of said stationary part in front of or behind said rotation axis for combined force support and damping of a movement of said movable part.

19. The airplane according to claim 7, comprising: one aisle; and overhead bins disposed on both sides of said aisle.

20. The airplane according to claim 19, wherein said passenger service unit is one of a plurality of passenger service units, said overhead bins define a lower plane, and said passenger service units are disposed between said overhead bins and the supporting structure and are substantially flush with said lower plane of said overhead bins.

21. The airplane according to claim 19, wherein said overhead bins disposed in a rear of the airplane are smaller than said overhead bins disposed elsewhere in the airplane according to a contour of a fuselage of the airplane, and said overhead bins have visible front sides disposed along a line.

22. The airplane according to claim 19, wherein said overhead bins are disposed in a rear of the airplane.

23. The airplane according to claim 19, which further comprises cover panels, and connecting elements disposed on a top side of said stationary part of said overhead bins for fastening of said cover panels without using tools.

24. The airplane according to claim 12, comprising: one aisle; and overhead bins disposed on both sides of said aisle.

25. The airplane according to claim 24, wherein said overhead bins define a lower plane, said passenger service unit is one of a plurality of passenger service units, and said passenger service units are disposed between said overhead bins and the supporting structure and are substantially flush with said lower plane of said overhead bins.

26. The airplane according to claim 24, wherein said rotation axis of said movable part of said overhead bins is disposed at a lateral distance of 81 to 91 cm and at a height of 177 to 187 cm from a center of a floor of the aisle.

27. The airplane according to claim 24, wherein said overhead bins disposed in a rear of the airplane are smaller than said overhead bins disposed elsewhere in the airplane according to a contour of a fuselage of the airplane, and said overhead bins have visible front sides disposed along a line.

28. The airplane according to claim 24, wherein said overhead bins are disposed in a front of the airplane.

29. The airplane according to claim 24, which further comprises cover panels, and connecting elements disposed on a top side of said stationary part of said overhead bins for fastening of said cover panels without using tools.

* * * * *